(12) United States Patent
Iio et al.

(10) Patent No.: US 12,278,406 B2
(45) Date of Patent: Apr. 15, 2025

(54) FUEL CELL SYSTEM

(71) Applicant: TOYOTA JIDOSHA KABUSHIKI KAISHA, Toyota (JP)

(72) Inventors: Atsuo Iio, Nagoya (JP); Toshihiro Egawa, Okazaki (JP); Hisaya Fujioka, Aichi-ken (JP); Makito Okumura, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 412 days.

(21) Appl. No.: 18/054,602

(22) Filed: Nov. 11, 2022

(65) Prior Publication Data

US 2023/0223569 A1 Jul. 13, 2023

(30) Foreign Application Priority Data

Jan. 11, 2022 (JP) .................................. 2022-002449

(51) Int. Cl.
*H01M 8/04082* (2016.01)
*H01M 8/04089* (2016.01)
*H01M 8/04302* (2016.01)

(52) U.S. Cl.
CPC ... *H01M 8/04201* (2013.01); *H01M 8/04097* (2013.01); *H01M 8/04302* (2016.02)

(58) Field of Classification Search
CPC ......... H01M 8/04201; H01M 8/04097; H01M 8/04302; H01M 8/04089; H01M 8/04225; H01M 8/04228; H01M 8/04303; H01M 8/04388; H01M 8/04753; H01M 8/04955; H01M 8/249

See application file for complete search history.

(56) References Cited

U.S. PATENT DOCUMENTS

2020/0127307 A1    4/2020   Kumei et al.
2020/0144640 A1*   5/2020   Kaneko ............. H01M 8/04253

FOREIGN PATENT DOCUMENTS

| EP | 3 324 472 A1 | 5/2018 |
| JP | 2006-134861 A | 5/2006 |
| JP | 2019149347 A | 9/2019 |
| JP | 2020-068063 A | 4/2020 |
| WO | 2017/010069 A1 | 1/2017 |

* cited by examiner

Primary Examiner — Stewart A Fraser
(74) Attorney, Agent, or Firm — Dickinson Wright, PLLC

(57) ABSTRACT

A controller of a FC system disclosed herein may be configured to: (1) start both of first and second FC stacks when a measured value of a gas sensor is lower than a first concentration: (2) maintain both of the first and second FC stacks stopped when the measured value is higher than a second concentration which is higher than the first concentration; and (3) when the measured value is from the first concentration to the second concentration, supply the fuel gas to the first FC stack while maintaining supply of the fuel gas to the second FC stack stopped, thereafter stop supply of the fuel gas to the first FC stack when a pressure in the first FC stack reaches a pressure threshold, and thereafter start the first FC stack when the pressure in the first FC stack after a predetermined time is higher than a pressure lower limit.

3 Claims, 5 Drawing Sheets

FUEL CELL SYSTEM

CROSS-REFERENCE TO RELATED APPLICATION

This application claims priority to Japanese Patent Application No. 2022-002449, filed on Jan. 11, 2022, the entire contents of which are incorporated herein by reference.

TECHNICAL FIELD

The technique disclosed herein relates to a fuel cell system in which a plurality of fuel cell stacks is connected in parallel.

BACKGROUND

Japanese Patent Application Publication No. 2019-149347 and International Publication No. WO2017/010069 describe fuel cell systems including a plurality of fuel cell stacks connected in parallel. The system of Japanese Patent Application Publication No. 2019-149347 includes a leakage detecting unit for detecting fuel gas leakage at each of the fuel cell stacks. The leakage detecting units each determine occurrence of fuel gas leakage from a pressure change of the fuel gas. In the system of Japanese Patent Application Publication No. 2019-149347, all the leakage detecting units concurrently operate before the fuel cell stack is started.

SUMMARY

In the fuel cell system of Japanese Patent Application Publication No. 2019-149347, the fuel cell stack is started after all the leakage detecting units confirm that fuel gas leakage is not occurring. When the fuel cell stack has a larger capacity, more time is required to supply fuel gas to the fuel cell stack before reaching a predetermined pressure. In other words, the fuel cell stack having a larger volume requires more time to confirm that fuel gas leakage is not occurring. A conventional fuel cell system requires a long period of time before starting power supply after receiving a start command. The present disclosure relates to a fuel cell system in which a plurality of fuel cell stacks is connected in parallel, and provides a technique to effectively perform a gas leakage check and reduce a time required to start the fuel cell system.

The fuel cell system disclosed herein may comprise a first fuel cell stack having a smaller volume and a second fuel cell stack having a large volume. When a gas leakage check on the first fuel cell stack having the smaller volume is completed, a controller may start the first fuel cell stack before a gas leakage check on the second fuel cell stack is completed. The fuel cell system disclosed herein can quickly start power supply after receiving a start command.

The fuel cell system disclosed herein may comprise a first fuel cell stack and a second fuel cell stack connected in parallel, a fuel tank configured to supply fuel gas to the first and second fuel cell stacks, a housing accommodating the first and second fuel cell stacks, a gas sensor configured to measure a gas concentration in the housing, and a controller. A volume of the second fuel cell stack may be larger than a volume of the first fuel cell stack. The controller may be configured to start the first and second fuel cell stacks in response to a start command.

The controller may be configured to perform the following processes when receiving the start command. (1) The controller may start both the first and second fuel cell stacks when a measured value of the gas sensor is lower than a first concentration. (2) The controller may maintain the first and second fuel cell stacks stopped when the measured value of the gas sensor is higher than a second concentration which is higher than the first concentration. (3) When the measured value is from the first concentration to the second concentration, the controller may supply the fuel gas to the first fuel cell stack while maintaining supply of the fuel gas to the second fuel cell stack stopped. The controller may stop supply of the fuel gas when a pressure in the first fuel cell stack reaches a pressure threshold. The controller may start the first fuel cell stack when the pressure in the first fuel cell stack after a predetermined time is higher than a pressure lower limit.

In the above fuel cell system, when it is confirmed that gas leakage is not occurring in the first fuel cell stack, the controller starts the first fuel cell stack without waiting for completion of a gas leakage check on the second fuel cell. By starting the first fuel cell stack having the smaller volume first, it is possible to quickly start power supply after the start command is received.

The present disclosure describes a fuel cell system of another aspect which does not necessarily require a housing or a gas sensor. The fuel cell system may include first and second fuel cell stacks connected in parallel, a fuel tank configured to supply fuel gas to the first and second fuel cell stacks, and a controller. A volume of the second fuel sell stack may be larger than a volume of the first fuel cell stack. The controller may be configured to start the first and second fuel cell stacks in response to a start command.

When receiving the start command, the controller may execute the following processes. (1) The controller may supply fuel gas to the first fuel cell stack while maintaining supply of the fuel gas to the second fuel cell stack stopped. (2) When a pressure in the first fuel cell stack reaches a predetermined first pressure threshold, the controller may stop supply of fuel gas to the first fuel cell stack. When the pressure in the first fuel cell stack (first pressure) is higher than a first pressure lower limit after the predetermined time, the controller may start the first fuel cell stack and start supply of fuel gas to the second fuel cell stack. (3) When the first pressure is lower than the first pressure lower limit, the controller may start the supply of the fuel gas to the second fuel cell stack without starting the first fuel cell stack. (4) The controller may stop the supply of the fuel gas to the second fuel cell stack when a pressure in the second fuel cell stack reaches a predetermined second pressure threshold, and start the second fuel cell stack when the pressure in the second fuel cell stack after a predetermined time (second pressure) is higher than a predetermined second pressure lower limit. (5) The controller may maintain the second fuel cell stack stopped when the second pressure is lower than the second pressure lower limit.

When it is found in the above process (2) that gas leakage is not occurring in the first fuel cell stack, the second fuel cell system starts the first fuel cell stack without waiting for completion of the gas leakage check on the second fuel cell stack. By starting the first fuel cell stack having the smaller volume first, it is possible to quickly start the power supply after the start command is received.

Details of the art disclosed herein and further developments will be described in "DETAILED DESCRIPTION".

DETAILED DESCRIPTION

First Embodiment

Figure 1:
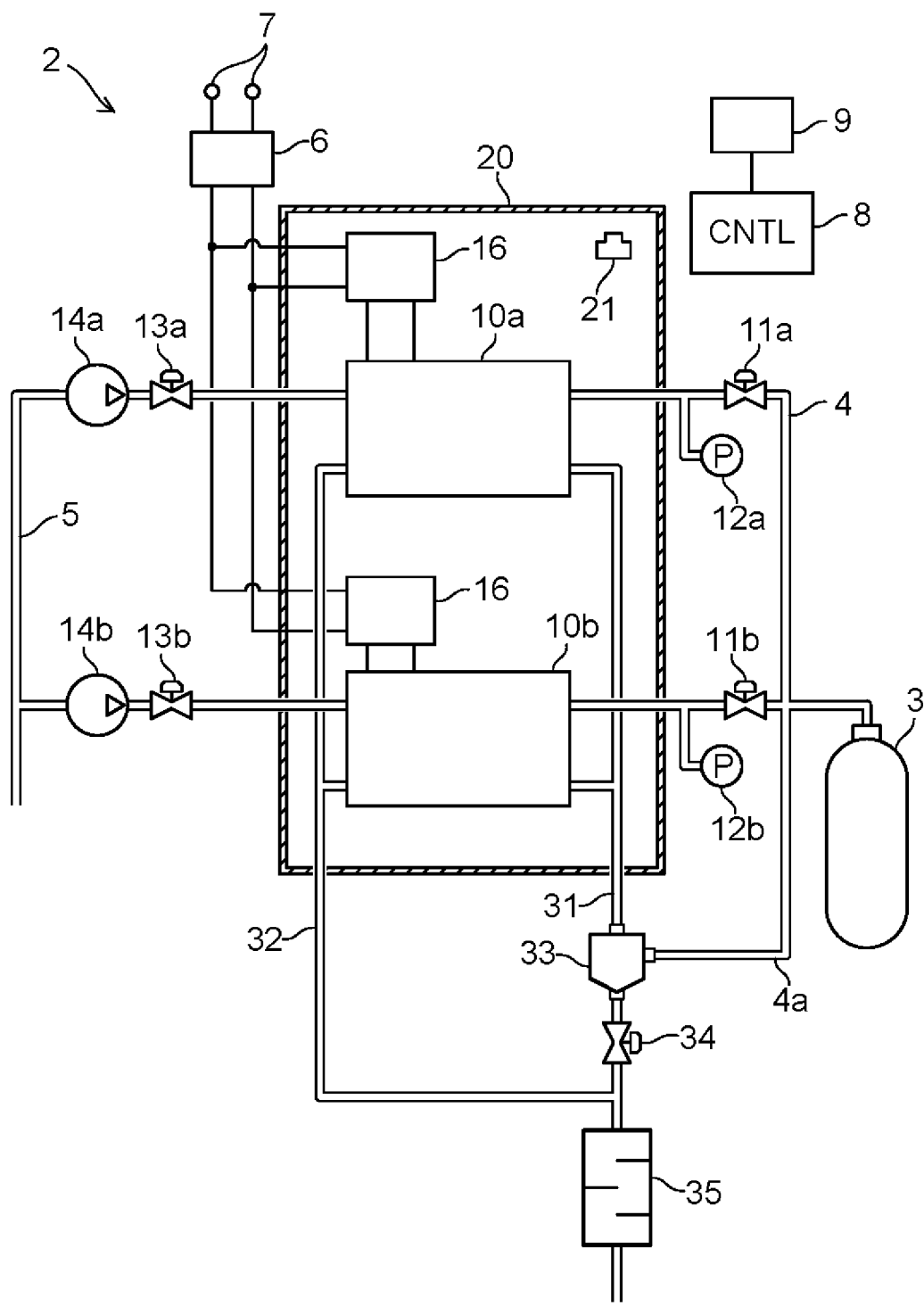
FIG. 1 illustrates a block diagram of a fuel cell system of a first embodiment.

A Fuel cell system 2 of a first embodiment will be described. Hereafter, "fuel cell" may be referred to as FC for simpler explanation. FIG. 1 illustrates a block diagram of an FC system 2 (fuel cell system 2). A controller 8 and devices (valves 11a, 11b, 13a, 13b, air compressors 14a, 14b, pressure sensors 12a, 12b, a gas sensor 21, a step-up converter 16, an inverter 6, and the like) are connected via communication lines, however, illustration of the communication lines is omitted.

The FC system 2 includes two FC stacks (a first FC stack 10a and a second FC stack 10b) and each of the FC stacks generates electricity. A volume of the second FC stack 10b is larger than a volume of the first FC stack 10a. In other words, the volume of the first FC stack 10a is smaller than the volume of the second FC stack 10b. The term "volume of FC stack" means a size of a space within the FC stack. When the FC stack has a larger volume, it requires more time to till the FC stack with fuel gas. Hereafter, the first FC stack 10a and the second FC stack 10b may be referred to as the FC stacks 10 when they are referred to without distinction.

A step-up converter 16 is provided to each of the FC stacks 10. The step-up converter 16 is connected to an output terminal of its corresponding FC stack 10, and an output terminal of each step-up converter 16 is connected to a direct current terminal of the inverter 6. The step-up converters 16 are configured to step up direct current power generated by the FC stacks 10 and supply the same to the inverter 6. The inverter 6 converts the stepped-up direct current power to alternating current power. A system output terminal 7 is connected to an alternating current terminal of the inverter 6, and power generated by the FC stacks 10 are supplied to other device from the system output terminal 7.

Fuel gas (hydrogen gas) is supplied from a fuel tank 3 to the FC stacks 10 through a fuel supply pipe 4. A fuel valve 11a (11b) is connected to the fuel supply pipe 4, and a flow rate of the fuel gas supplied to the first FC stack 10a (second FC stack 10b) can be adjusted by adjusting an opening of the fuel valve 11a (11b). The fuel valves 11a, 11b may be referred to as injectors.

A pressure sensor 12a (12b) is connected to a portion downstream of the fuel valve 11a (11b). A pressure measured by the pressure sensor 12a (12b) is equal to a pressure in the first FC stack 10a (the second FC stack 10b). While the FC stacks 10 generate electricity, the controller 8 controls the openings of the fuel valves 11a, 11b to maintain a measured value of the pressure sensor 12a (12b) within a suitable range.

Air (oxygen) is supplied to the FC stacks 10 via an air supply pipe 5. An air compressor 14a (14b) and an air valve 13a (13b) are disposed on the air supply pipe 5, and air is supplied to the first FC stack 10a (the second FC stack 10b) by the air compressor 14a (14b). An amount of air (an amount of oxygen) supplied to the first FC stack 10a (second FC stack 10b) is adjusted by an output of the air compressor 14a (14b) and an opening of the air valve 13a (13b).

In the FC stacks 10, the fuel gas (hydrogen) and the air (oxygen) react, by which the electricity is generated. Gas left after the reaction (exhaust gas) is supplied to a gas/liquid separator 33 through an exhaust gas pipe 31. In the gas/liquid separator 33, the hydrogen gas which was not used in the reaction is separated from the exhaust gas. The separated hydrogen gas is returned to the fuel supply pipe 4 again through the return pipe 4a. The remaining exhaust gas and water are mixed with air exhausted through the exhaust air pipe 32 from the FC stacks 10 and are discharged to the atmosphere through a muffler 35. An exhaust valve 34 is disposed at an outlet of the gas/liquid separator 33. By adjusting an opening of the exhaust valve 34, the fuel gas is diluted with air until a fuel gas concentration is reduced to a suitable concentration. When the fuel gas remaining in the FC stacks 10 is exhausted, the fuel gas is diluted with air supplied from the exhaust air pipe 32 to a predetermined safety concentration and then exhausted out into the atmosphere.

The first FC stack 10a and the second FC stack 10b are housed in a housing 20. The housing 20 includes a gas sensor 21 configured to measure a gas concentration in the housing 20.

Measured values of sensors such as the gas sensor 21 and the pressure sensors 12a, 12b are transmitted to the controller 8. As described earlier, actuators such as the air compressor 14a, devices such as the FC stacks 10 and the step-up converters 16, and the controller 8 are connected by the communication lines, and the controller 8 controls the actuators and the devices.

A starting process by the FC system 2 will be described. When the controller 8 externally receives a start command, the controller 8 starts the FC stacks 10 and prepares to supply electric power from the system output terminal 7. Prior to starting the FC stacks 10, the controller 8 checks whether fuel gas leakage is occurring in the FC stacks 10 as a safety check. Hereafter, "fuel gas leakage" may simply be referred to as "gas leakage" for simplified explanation.

Firstly, the controller 8 checks whether the fuel gas is filled within the housing 20 or not using the measured value of the gas sensor 21 (the fuel gas concentration in the housing 20). If the fuel gas concentration within the housing 20 is lower than a predetermined first concentration, it can be confirmed that gas leakage is not occurring in all the FC stacks 10 without checking gas leakage in each FC stack 10. By providing the gas sensor 21 in the housing 20, the gas leakage check can be finished in a shorter period of time as compared to the case in which gas leakage in each of the FC stacks 10 is checked. In other words, a time required to finish the preparation for power supply since when the start command was accepted can be reduced.

When the fuel gas concentration within the housing 20 is higher than a predetermined second concentration, the controller 8 determines that it is not suitable to start the FC stacks 10 and stops the process without starting any of the FC stacks 10. The second concentration is set to a value higher than the first concentration.

When the fuel gas concentration within the housing 20 is from the first concentration to the second concentration, the FC stack(s) 10 in which gas leakage is not occurring may be started. In that case, the controller 8 first checks gas leakage in the first FC stack 10a having the smaller volume, and when it is confirmed that gas leakage is not occurring, then the controller 8 starts the first FC stack 10a without waiting for completion of the gas leakage check on the second FC stack 10*b*. Since the first FC stack 10*a* has the small volume, the time required for its gas leakage check is short. By checking gas leakage in the first FC stack 10*a* having the smaller volume before the second FC stack 10*b* having the larger volume, the time to finish the preparation for power supply since when the start command was accepted can be reduced.

Figure 2:
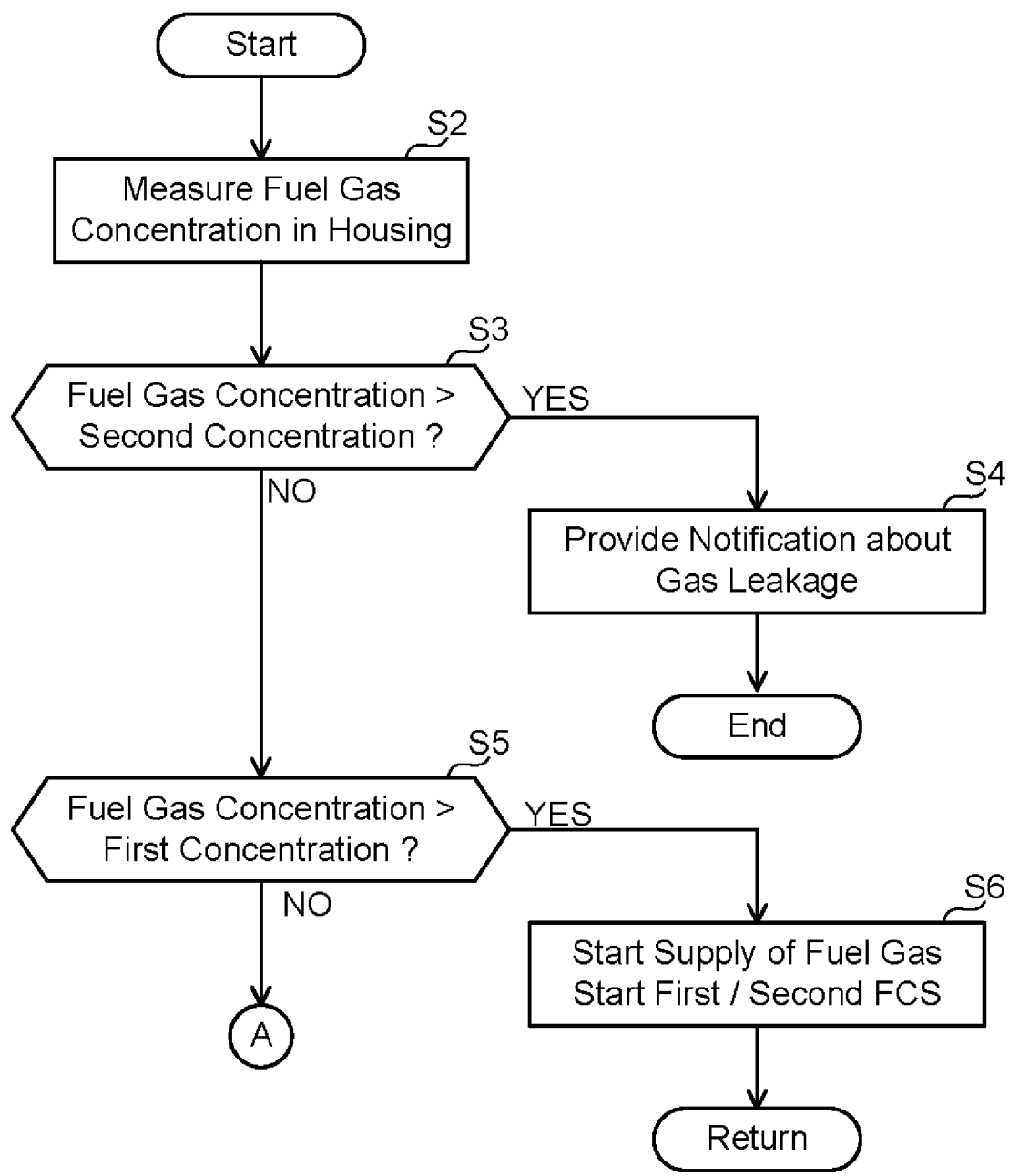
FIG. 2 illustrates a flowchart of a starting process.
Figure 3:
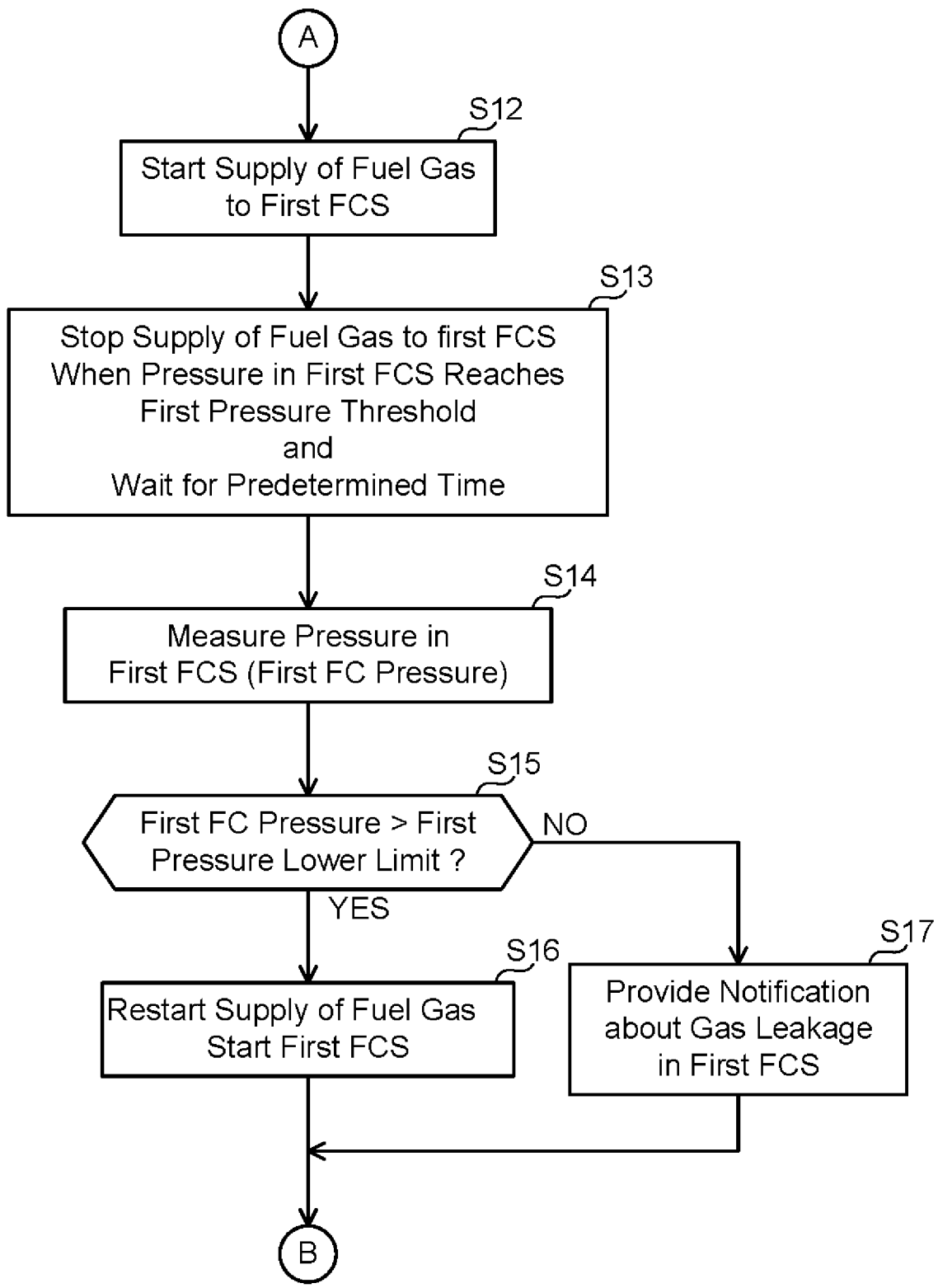
FIG. 3 illustrates a flowchart of the starting process (continuation of FIG. 2)
Figure 4:
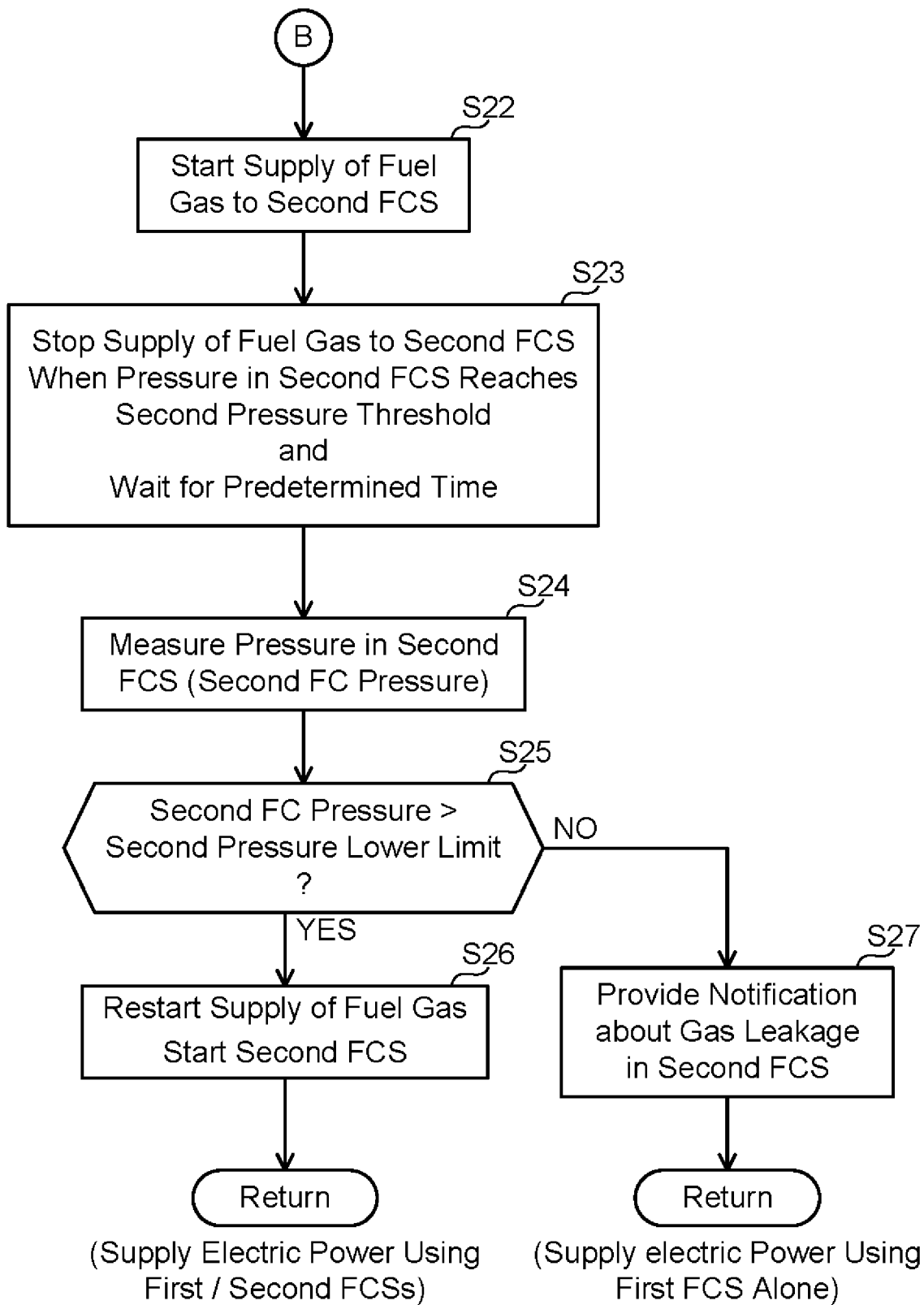
FIG. 4 illustrates a flowchart of the starting process (continuation of FIG. 3)

The starting process executed by the controller 8 will be explained in detail with reference to the flowcharts in FIGS. 2 to 4. The term "FCS" in FIGS. 3 and 4 means a fuel cell stack.

The controller 8 measures the fuel gas concentration within the housing 20 using the gas sensor 21 (step S2). When the fuel gas concentration is higher than the second concentration, the controller 8 determines it is not suitable to start the FC stacks 10, and maintains both of the first and the second FC stacks 10*a*, 10*b* stopped. Further, the controller 8 provides notification about gas leakage, and terminates the process (step S3: YES, S4). The notification about gas leakage is transmitted to the display 9 connected to the controller 8 (see FIG. 1) or to the user's terminal. A message indicating occurrence of gas leakage is displayed on the display 9 or on the user's terminal which has received the notification. When the fuel cell system 2 is installed on an automobile, the message indicating occurrence of gas leakage is displayed on the instrument panel.

When the fuel gas concentration is not higher than the second concentration, the controller 8 compares the fuel gas concentration within the housing 20 to the first concentration (step S3; NO, S5). As described earlier, the second concentration is set to a concentration not suitable to start the FC stacks 10, and the first concentration is set to a value lower than the second concentration. The first concentration is set to a value indicating a possibility of occurrence of gas leakage in one of the two FC stacks 10.

When the fuel gas concentration is lower than the first concentration (step S5: YES), the controller 8 determines that gas leakage is not occurring in any of the two FC stacks 10. In that case, the controller 8 opens the fuel valves 11*a*, 11*b*, starts supply of fuel gas to the two FC stacks 10 and supply of air, and starts the two FC stacks 10 (step S6). When the step S6 is executed, preparation to supply electric power is completed. After step S6, the controller 8 adjusts amounts of fuel gas and air (oxygen) supplied to the FC stacks 10 so that electric power as required can be supplied.

On the other hand, when the fuel gas concentration is from the first concentration to the second concentration (step S3: NO, S5: NO), the controller 8 checks gas leakage of the first FC stack 10*a*. The flowchart of FIG. 3 corresponds to the gas leakage check on the first FC stack 10*a*.

Firstly, the controller 8 opens the fuel valve 11*a* and starts supply of fuel gas to the first FC stack 10*a* (step S12). At this time, the fuel valve 11*b* remains closed and the controller 8 maintains the fuel gas supply to the second FC stack 10*b* stopped. The controller 8 continues the supply of fuel gas to the first FC stack 10*a* until the pressure in the first FC stack 10*a* reaches a first pressure threshold (step S13). The first pressure threshold is set to a value which allows the first FC stack 10*a* to generate electricity. The pressure within the first FC stack 10*a* is measured by the pressure sensor 12*a*.

When the pressure in the first FC stack 10*a* reaches the first pressure threshold, the controller 8 closes the fuel valve 11*a* and stops supply of fuel to the first FC stack 10*a*. The controller 8 then waits for a predetermined time (step S13). The predetermined time is set to for example one minute. If the pressure in the first FC stack 10*a* is considerably decreased after the predetermined time, it is found that gas leakage is occurring in the first FC stack 10*a*. Contrary to this, when the pressure in the first FC stack 10*a* is not decreased so much even after the predetermined time elapses, it is found that no gas leakage is occurring.

After waiting for the predetermined period, the controller 8 measures the pressure in the first FC stack 10*a* again using the pressure sensor 12*a* (step S14). The pressure in the first FC stack 10*a* after the predetermined time elapses is referred to as a first FC pressure for explanation purposes.

When the first FC pressure is higher than the first presser lower limit, the controller 8 determines that gas leakage is not occurring in the first FC stack 10*a*. In this case, the controller 8 restarts supply of fuel to the first FC stack 10*a* and starts the first FC stack 10*a* (step S15: YES, S16). When step S16 is executed, supply or electric power by the first FC stack 10*a* is enabled. After step S16, the controller 8 adjusts amounts of fuel gas and air (oxygen) supplied to the first FC stack 10*a* so that electric power as required can be supplied. At this point, the second FC stack 10*b* is not started yet.

When the first FC pressure is lower than the first pressure lower limit, the controller 8 provides notification about gas leakage in the first FC stack 10*a* (step S15: NO, S17). As with the notification in step S4, the notification in step S17 is transmitted from the controller 8 to the display 9 or to the user's terminal.

Since the gas concentration within the housing 20 is equal to or lower than the second concentration (step S3: NO), even if gas leakage is occurring in the second FC stack 10*b*, the first FC stack 10*a* may be started.

Next, the controller 8 executes a gas leakage check process for the second FC stack 10*b*. The flowchart of FIG. 4 illustrates the gas leakage check process for the second FC stack 10*b*.

The gas leakage check process for the second FC stack 10*b* is the same as the gas leakage check process for the first FC stack 10*a*.

The controller 8 opens the fuel valve 11*b* and starts supply of fuel gas to the second FC stack 10*b* (step S22). The controller 8 continues the supply of fuel gas until the pressure in the second FC stack 10*b* reaches a second pressure threshold (step S23). The second pressure threshold is set to a value at which the second FC stack 10*b* can generate electric power. The pressure within the second FC stack 10*b* is measured by the pressure sensor 12*b*.

When the pressure in the second FC stack 10*b* reaches the second pressure threshold, the controller 8 closes the fuel valve 11*b* and stops the supply of fuel to the second FC stack 10*b*. Then, the controller 8 waits for a predetermined time (step S23). If the pressure in the second FC stack 10*b* is substantially decreased after waiting for the predetermined time, it is found that gas leakage is occurring in the second FC stack 10*b*. Contrary to this, if the pressure in the second FC stack 10*b* is not decreased so much even after the predetermined time elapses, it is found that gas leakage is not occurring in the second FC stack 10*b*.

After waiting for the predetermined time, the controller 8 measures the pressure within the second FC stack 10*b* again using the pressure sensor 12*b* (step S24). The pressure in the second FC stack 10*b* after the predetermined time elapses is referred to as a second FC pressure for explanation purposes.

When the second FC pressure is higher than a predetermined second pressure lower limit, the controller 8 restarts the supply of fuel to the second FC stack 10*b* and starts the second FC stack 10*b* (step S25: YES, S26). When step S26 is executed, power supply by the second FC stack 10*b* is also enabled. After step S26, the controller 8 adjusts amounts of fuel gas and air (oxygen) supplied to the first FC stack 10a and the second FC stack 10b so that power as required can be supplied.

On the other hand, when the second FC pressure is lower than the second pressure lower limit, the controller 8 provides notification about gas leakage in the second FC stack 10b (step S25: NO, S27). The controller 8 maintains the second FC stack 1013 stopped. As with the notification in step S4, the notification in step S27 is transmitted from the controller 8 to the display 9 or to the user's terminal.

When step S26 is executed, the FC system 2 generates electric power using the two FC stacks 10. When the determination in step S25 is NO, the FC system 2 generates electricity only with the first FC stack 10a. The controller 8 maintains the second FC stack 10b stopped. At this time, the FC system 2 cannot supply a large amount of electric power, and can supply electric power within a capacity of the first FC stack 10a.

As described above, the FC system 2 first checks the gas concentration within the housing 20, and when it determines that no gas leakage is occurring, the FC system 2 immediately starts the first FC stack 10a and the second FC stack 10b. The FC system 2 promptly finishes the preparation for power supply after receiving the start command.

When the gas concentration in the housing 20 is from the first concentration to the second concentration, the FC system 2 first performs the gas leakage check for the first FC stack 10a having the small volume. Since the first FC stack 10a has a smaller volume as compared to the second FC stack 10b, it is possible to quickly fill it with the fuel gas. When the gas leakage check is performed based on decrease in the gas pressure, it is possible to more quickly finish the gas leakage check for an FC stack having a smaller volume. Since the FC system 2 first checks gas leakage in the first FC stack 10a having a smaller volume, a time required to finish the preparation to supply electric power since the start command is received is short.

When gas leakage is detected in the first FC stack 10a (step S15: NO), the controller 8 dilutes the fuel gas in the first FC stack 10a with air and exhausts the same to the atmosphere. When gas leakage is detected in the second FC stack 10b (step S25: NO) as well, the controller 8 dilutes the fuel gas in the second FC stack 10b with air and exhausts the same to the atmosphere.

Second Embodiment

Figure 5:
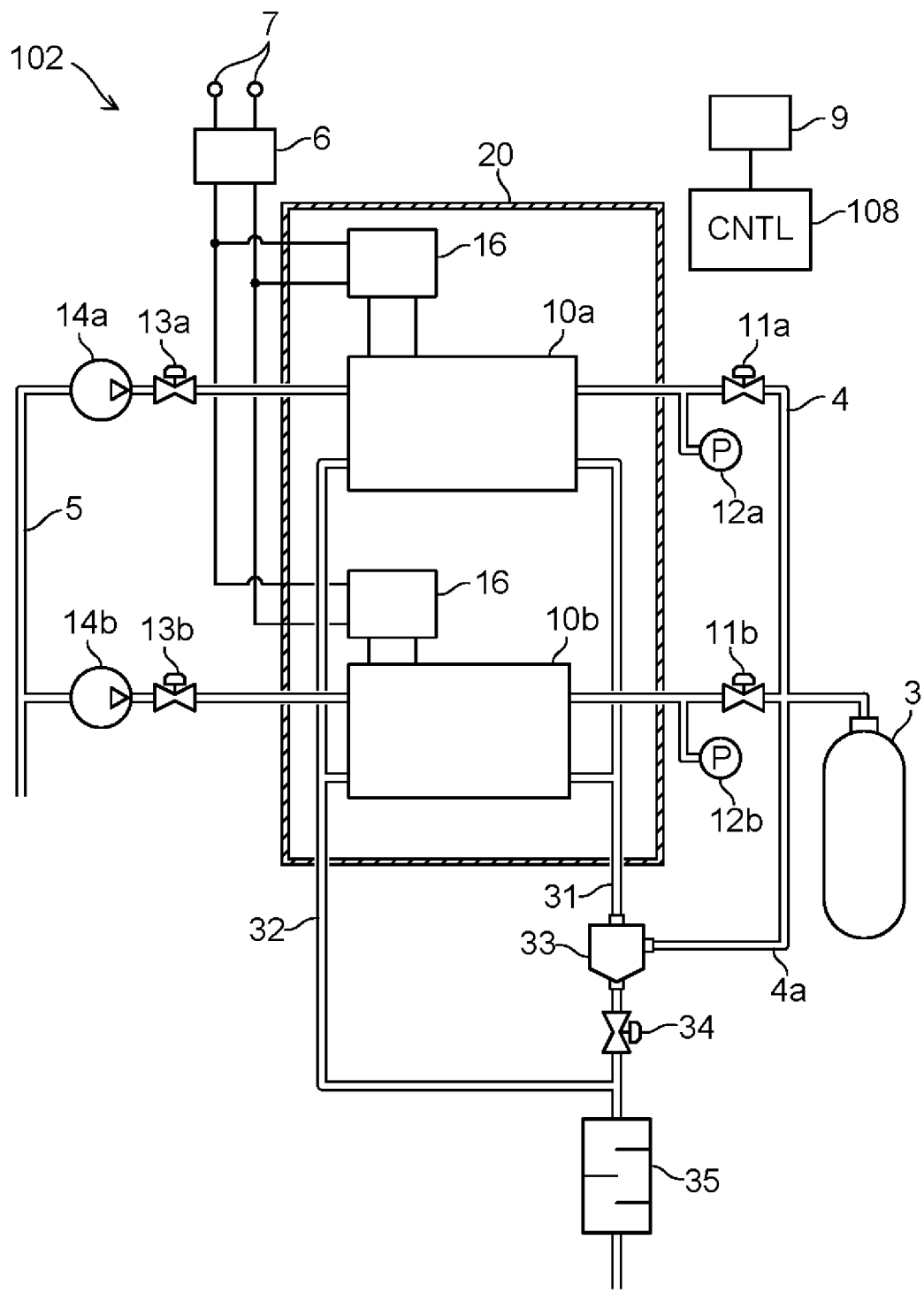
FIG. 5 illustrates a block diagram of a fuel cell system of a second embodiment.

An FC system 102 of a second embodiment will be explained with reference to FIG. 5. The FC system 102 has the same structure as the FC system 2 of the first embodiment except that the second FC system 102 does not include the gas sensor 21. Accordingly, the FC system 102 does not perform detection of gas leakage using the gas sensor. A controller 108 of the FC system 102 does not execute the process of FIG. 2 but performs the gas leakage check by the process of FIGS. 3 and 4. As with the FC system 2 of the first embodiment, in the FC system 102 of the second embodiment as well, a volume of a first FC stack 10a is smaller than a volume of a second FC stack 10b.

When receiving a start command, the controller 108 executes the following process. (1) The controller 108 starts supply of the fuel gas to the first FC stack 10a while maintaining the supply of the fuel gas to the second FC stack 10b stopped (step S12). (2) When the pressure in the first FC stack 10a reaches a predetermined first pressure threshold, the controller 108 stops the supply of fuel gas to the first FC stack 10a and waits for a predetermined time (step S13). When the pressure in the first FC stack 10a (the first FC pressure) is higher than a first pressure lower limit after waiting for the predetermined time, the controller 108 starts the first FC stack 10a (step S15: YES, S16). Next, the controller 108 starts supply of fuel gas to the second FC stack 10b (step S22). (3) When the first FC pressure is lower than the first pressure lower limit, the controller 108 starts the supply of fuel gas to the second FC stack 10b without starting the first FC stack 10a (step S15: NO. S17, S22). In other words, the controller 108 maintains the first FC stack stopped. (4) When the pressure in the second FC stack 101) reaches a second pressure threshold, the controller 108 stops the supply of fuel gas to the second FC stack 10b and waits for the predetermined time (step S23). When the pressure in the second FC stack 10b (second FC pressure) is higher than a predetermined second pressure lower limit after waiting for the predetermined time, the controller 108 starts the second FC stack 10b (step S25: YES, S26). (5) When the second FC pressure is lower than the second pressure lower limit, the controller 108 does not start the second FC stack 10b (step S25: NO, S27). In other words, the controller 108 maintains the second FC stack 10b stopped.

The FC system 102 of the second embodiment also performs the gas leakage check on the first FC stack 10a having the smaller volume before the second FC stack 10b. When it is confirmed that gas leakage is not occurring in the first FC stack 10a, the controller 108 starts the first FC stack 10a without waiting for completion of the gas leakage check on the second FC stack 10b. The FC system 102 of the second embodiment also can quickly start the power supply after receiving the start command.

Points to be noted concerning the technique explained in the embodiment will be described. The FC system disclosed herein may include three or more FC stacks connected in parallel. It is enough that at least one of the three or more FC stacks has a volume smaller than that of the other FC stacks.

In the explanation of the embodiment, the recitation "higher than" may be replaced with "equal to or higher than". Similarly, the recitation "lower than" may be replaced with "equal to or lower than". In other words, in determination of the inequalities in the flowcharts, either "YES" or "NO" may include the case in which a right member is equal to a left member.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. Further, the purpose of the examples illustrated by the present description or drawings is to satisfy multiple objectives simultaneously, and satisfying any one of those objectives gives technical utility to the present disclosure.

What is claimed is:
1. A fuel cell system comprising:
   a first fuel cell stack;
   a second fuel cell stack connected to the first fuel cell stack in parallel, a volume of the second fuel cell stack being larger than a volume of the first fuel cell stack;
   a fuel tank configured to supply fuel gas to the first and second fuel cell stacks;
   a housing accommodating the first and second fuel cell stacks;

a gas sensor configured to measure a gas concentration in the housing; and a controller configured to start the first and second fuel cell stacks in response to a start command, wherein the controller is configured to:
(1) start both of the first and second fuel cell stacks when a measured value of the gas sensor is lower than a first concentration;
(2) maintain both of the first and second fuel cell stacks stopped when the measured value is higher than a second concentration which is higher than the first concentration; and
(3) when the measured value is from the first concentration to the second concentration, supply the fuel gas to the first fuel cell stack while maintaining supply of the fuel gas to the second fuel cell stack stopped, thereafter stop supply of the fuel gas to the first fuel cell stack when a pressure in the first fuel cell stack reaches a pressure threshold, and thereafter start the first fuel cell stack when the pressure in the first fuel cell stack after a predetermined time is higher than a pressure lower limit.

2. A fuel cell system comprising:

a first fuel cell stack;

a second fuel cell stack connected to the first fuel cell stack in parallel, a volume of the second fuel cell stack being larger than a volume of the first fuel cell stack;

a fuel tank configured to supply fuel gas to the first and second fuel cell stacks; and a controller configured to start the first and second fuel cell stacks in response to a start command, wherein the controller is configured to:
(1) supply the fuel gas to the first fuel cell stack while maintaining supply of the fuel gas to the second fuel cell stack stopped,
(2) stop supply of the fuel gas to the first fuel cell stack when a first pressure in the first fuel cell stack reaches a first pressure threshold,
(3a) when the first pressure in the first fuel cell stack after a predetermined time is higher than a first pressure lower limit, start the first fuel cell stack and start the supply of the fuel gas to the second fuel cell stack, or
(3b) when the first pressure is lower than the first pressure lower limit, start the supply of the fuel gas to the second fuel cell stack without starting the first fuel cell stack,
(4) stop the supply of the fuel gas to the second fuel cell stack when a second pressure in the second fuel cell stack reaches a second pressure threshold, and
(5a) start the second fuel cell stack when the second pressure in the second fuel cell stack after a predetermined time is higher than a second pressure lower limit, or
(5b) maintain the second fuel cell stack stopped when the second pressure is lower than the second pressure lower limit.

3. The fuel cell system of claim 2, wherein the controller is configured to:

dilute the fuel gas in the first fuel cell stack with air and exhaust the diluted fuel gas when the first pressure is lower than the first pressure lower limit, and dilute the fuel gas in the second fuel cell stack with air and exhaust the diluted fuel gas when the second pressure is lower than the second pressure lower limit.

* * * * *